June 15, 1965  M. A. PIERRAT  3,189,363
MOBILITY ADAPTERS
Filed Nov. 8, 1963  6 Sheets-Sheet 1
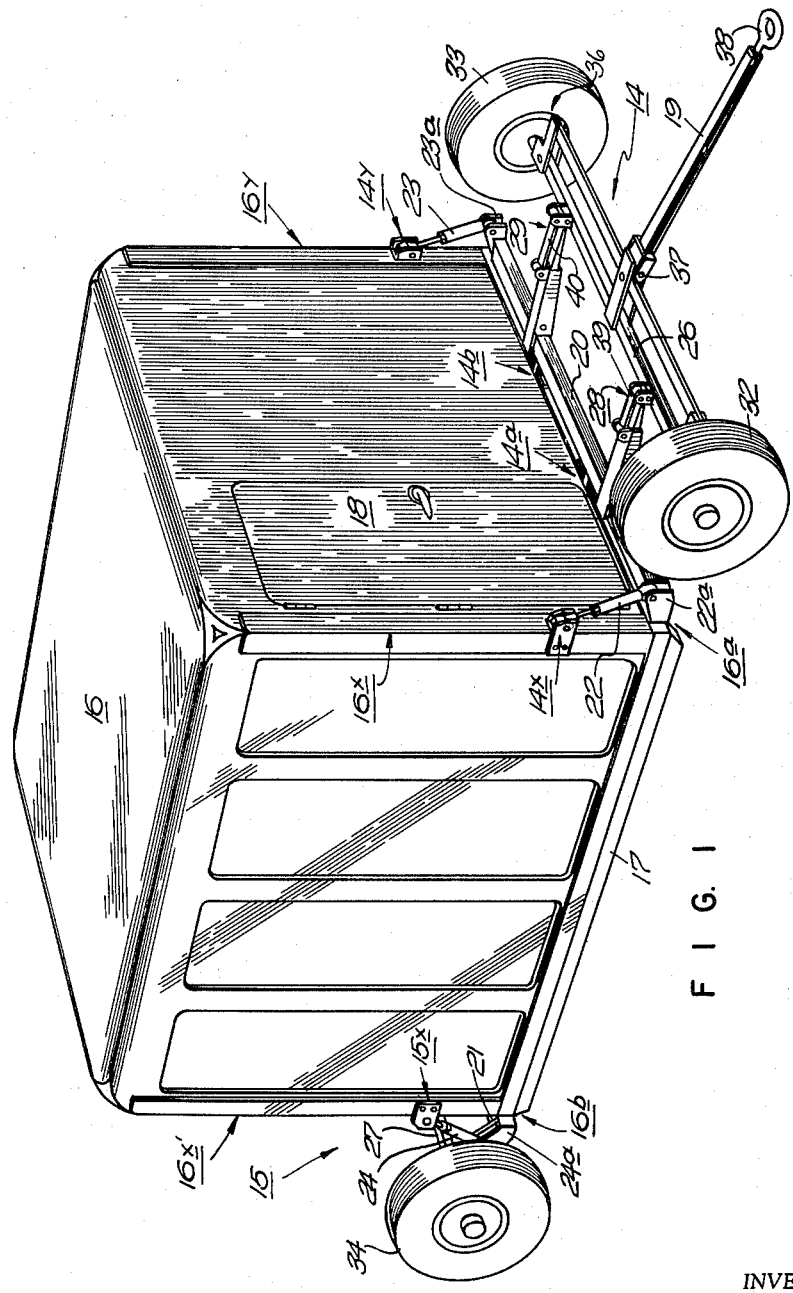
INVENTOR.
MICHEL A. PIERRAT
BY
Dike, Thompson, Bronstein & Mrose
ATTORNEYS

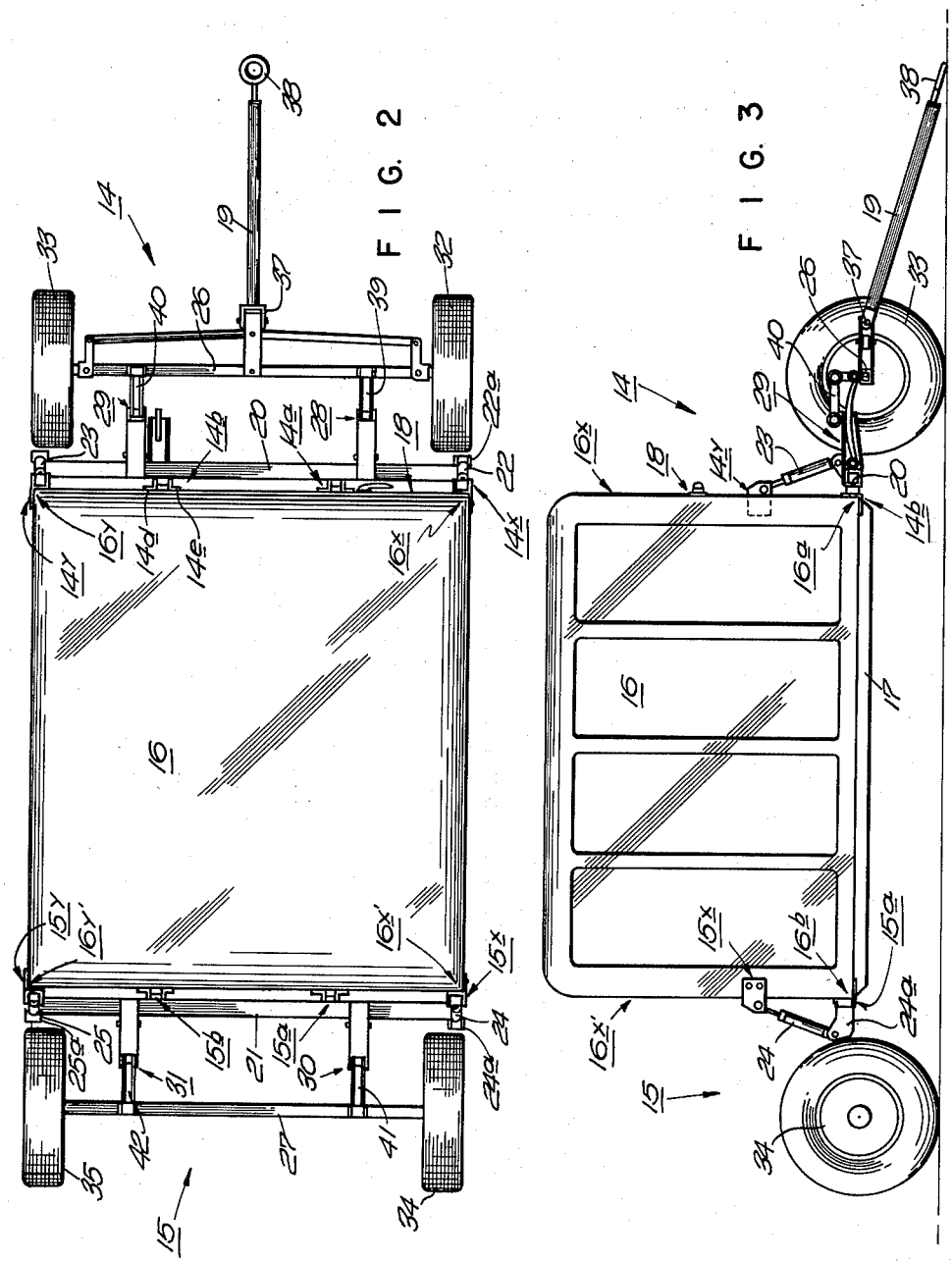

INVENTOR.
MICHEL A. PIERRAT

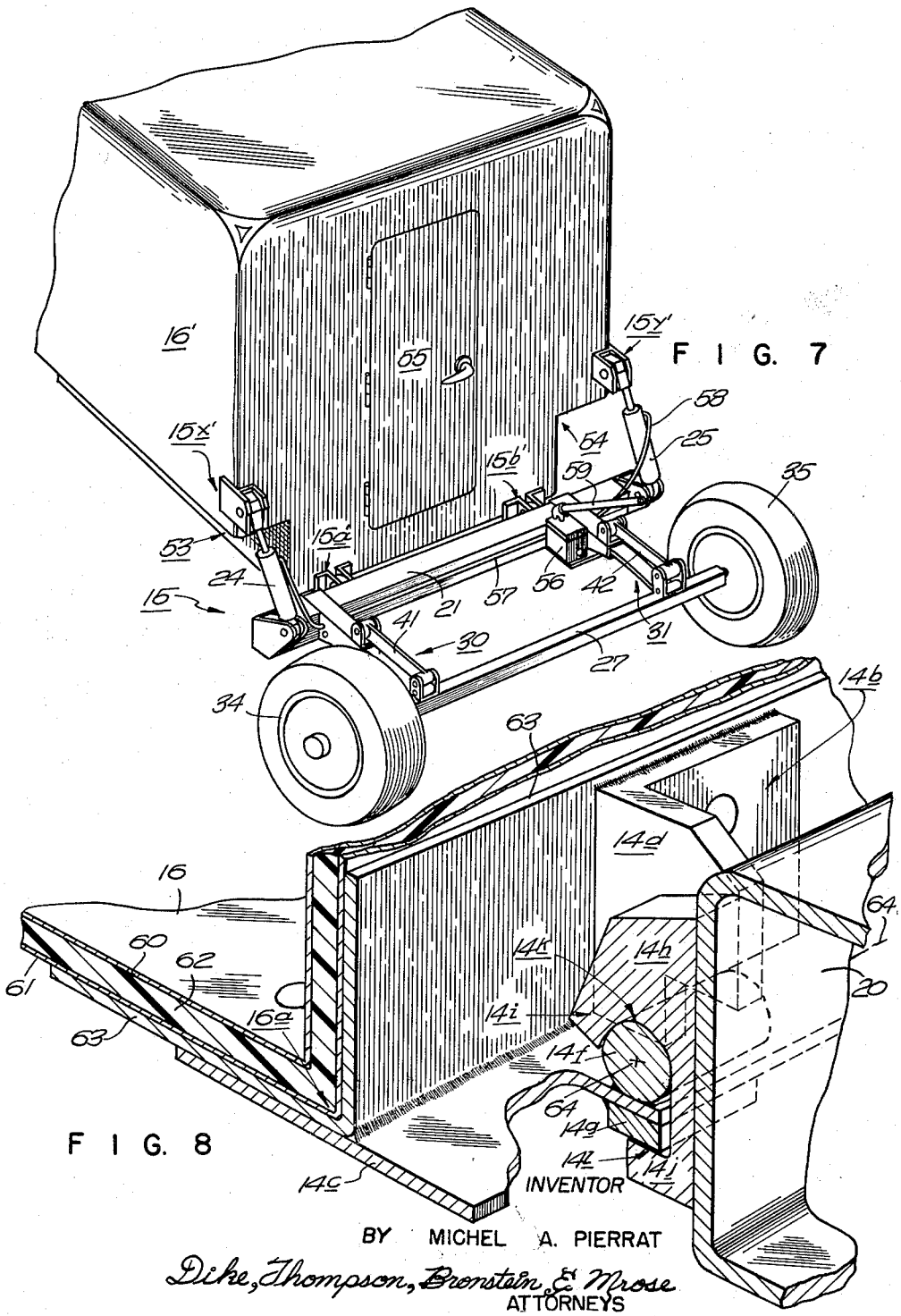

June 15, 1965  M. A. PIERRAT  3,189,363
MOBILITY ADAPTERS
Filed Nov. 8, 1963  6 Sheets-Sheet 5
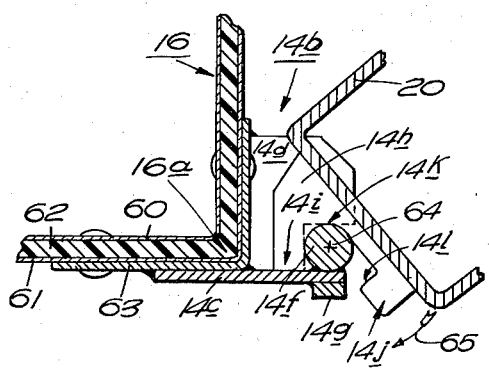
FIG. 9A
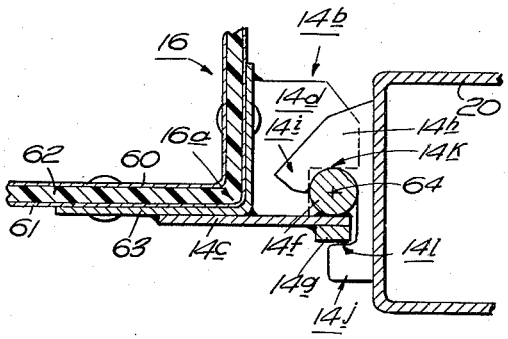
FIG. 9B
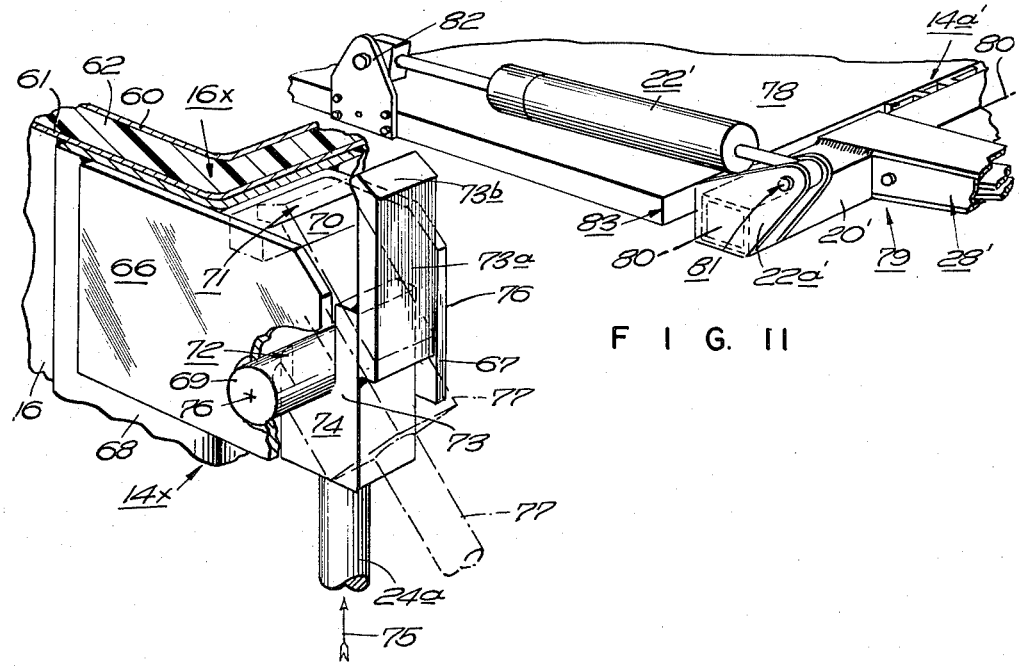
FIG. 10
FIG. 11
INVENTOR.
MICHEL A. PIERRAT
BY
Dike, Thompson, Bronstein & Mrose
ATTORNEYS

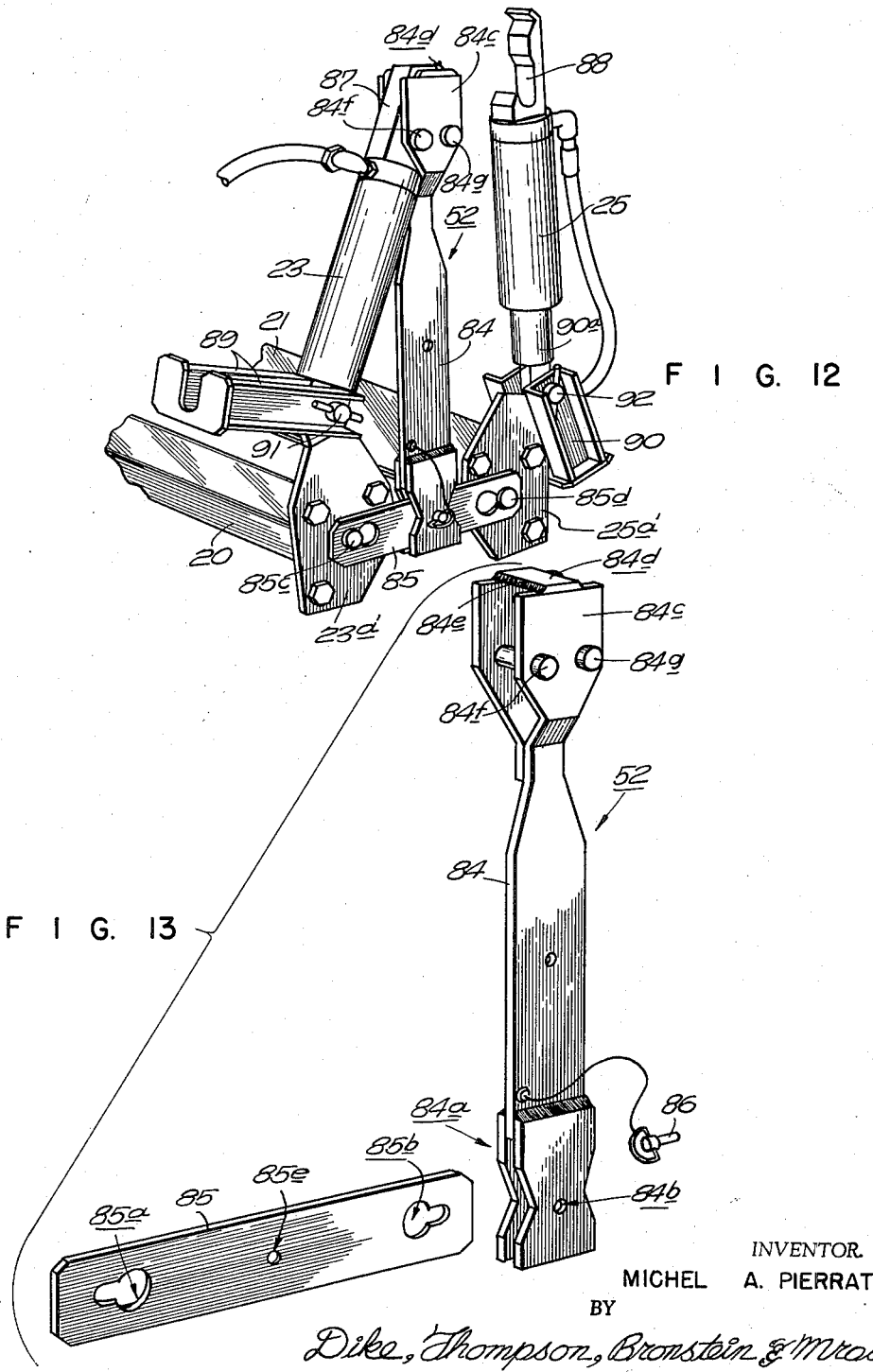

United States Patent Office 3,189,363
Patented June 15, 1965

3,189,363
MOBILITY ADAPTERS
Michel A. Pierrat, Andover, Mass., assignor to Precitec Co., Inc., North Reading, Mass., a corporation of Massachusetts
Filed Nov. 8, 1963, Ser. No. 322,406
19 Claims. (Cl. 280—35)

The present invention relates to improvements in the transportation of normally-immobilized loads and, in one particular aspect, to novel and improved wheeled apparatus of relatively uncomplicated and low-cost but rugged construction which is easily handled and readily adapts loads of a variety of configurations to shock-isolated conveyance by towing.

It has been known heretofore to provide wheel sets which may be fitted to and demounted, from objects to facilitate their movement, under circumstances, which would not justify permanent attachment of wheels. Especially in the case of massive loads, the wheel and axle assemblies, as well as springs, shock absorbers, and the like, must be of sound and substantial fabrication, which involves relatively high expense, and yet the anticipated infrequent movements may not actually warrant large investments. This is true of many trailer-type structures which need be hauled about only occasionally, and accounts for much higher costs than many potential users will consider justified by the expected amount of travel. Lightweight and uncomplicated constructions do not result when it is merely attempted to adapt common automotive or truck-type wheel and framework units to uses as demountable rolling attachments; in general, such units tend to involve massive frames as well as rather intricate spring suspensions. Mechanisms used to connect and decouple the wheeled units are often found to be difficult to fix and lock securely in place, and to disengage; moreover, such mechanisms may also require that the supported structure possess rigid high-strength internal framing, be limited to a particular geometry, and have doors or other openings or irregularities confined to restricted locations where they will not obstruct or weaken the connection sites. In accordance with the present teachings, however, wheeled adapters of relatively simple and trouble-free unique construction are capable of imparting mobility to stationary structures, containers and other loads of a wide variety of configurations, and are easily and securely made fast at positions which do not require the presence of internal framing and do not create material interference with exposed parts of the structures.

It is one of the objects of the present invention, therefore, to provide novel and improved apparatus of uncomplicated low cost construction for rendering loads mobile and towable.

Another object is to provide unique wheeled adapters, for imparting mobility to massive normally stationary objects, which are of relatively lightweight and simple construction affording improved isolation from shock and vibration.

A further object is to provide improved wheeled adapters, for the maneuvering of heavy loads over irregular terrain, in which isolated suspension of loading is achieved through torsional resilience of the adapter framework and through torsionally-flexed semi-elliptical springs.

Still further it is an object to provide unique partially-encased leaf-spring suspensions for demountable running gear and the like, in which torsional twisting is exploited advantageously and wherein road clearance, weight, and cost factors are improved.

It is also an object to provide adapters, for the rolling of bulky loads, which are temporarily joined only along strong edge sites of such loads and which exploit torsional resilience of framework to enhance smoothness of support.

Yet another object is to provide demountable wheeled adapters for transporting loads wherein positive and fail-safe locking connections are made and sustained automatically upon elevation of the loads to a transporting level, and upon the joining and elevating of a pair of such adapters.

By way of a summary account of practice of this invention in one of its aspects, a normally-immobile bulky shelter of generally rectangular shape, such as is employed for the housing of field electronic gear and operating personnel, is provided with special connectors at spaced positions along its bottom end edges, as well as along its upstanding corner edges. These connectors mate with connectors carried by two separate wheeled adapters each including a single axle supported a pair of wheels, and each further including a box-beam type of torsion member flexibly joined and maintained essentially parallel with the axle by a pair of simple laterally-spaced semi-elliptical leaf springs which are bowed upwardly and at their tops slidably abut rigid restraining members secured either to the axle or the torsion member. Manually-pumped hydraulic jacks located near the ends of the torsion member in laterally-spaced relation to the springs extend to apply leverages between the load and torsion member, by way of the connectors, in direction to cause the torsion member to be raised horizontal and parallel with the axle. Load support thus incorporates torsional resilience of the torsion members and elliptical springs, as well as vertical flexural resilience of the elliptical springs, with each of the wheels being capable of transient articulations under road shock substantially independently of the others. The respective connectors utilize mating parts which join and separate readily when the load is at ground level but become securely trapped when the load is elevated.

Although the features of this invention which are believed to be novel are set forth in the appended claims, greater detail as to practice of the invention in its preferred embodiments, and the further objects and advantages thereof, may be readily comprehended through reference to the following description taken in connection with the accompanying drawings, wherein:

FIGURE 1 is a perspective view of a set of mobility adapters supporting a shelter unit, the constructions being in accordance with teachings of the present invention;

FIGURE 2 provides a plan view of the assembly of FIGURE 1, on a somewhat reduced scale;

FIGURE 3 portrays the same assembly from the side, and along a section line through the front adapter at the side of a spring suspension;

FIGURE 7 represents a portion of a payload, in the form of an irregularly-shaped shelter, coupled with a mobility adapter in accordance with the present invention;

FIGURE 8 is a cross-sectioned fragment of a corner of a payload which lacks internal framework, together with fragments of self-locking connector in engagement with a connector of a mobility adapter;

FIGURE 9A is a side view, partly in cross-section, of the connector arrangement shown in FIGURE 8, with the connector elements being oriented for connection or disconnection;

FIGURE 9B illustrates the same connector arrangement with the connector elements oriented for firm locking;

FIGURE 10 depicts a self-locking connector arrangement involving mated connectors affixed to a hydraulic jack and along a vertical corner of a payload;

FIGURE 11 illustrates the attachment of the improved mobility adapter to a pallet-type load;

Figure 4:
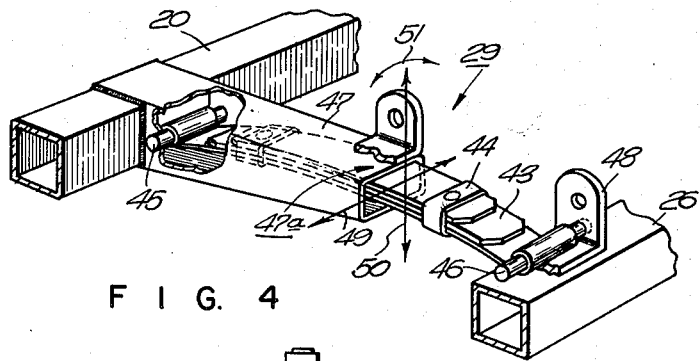
FIGURE 4 is a pictorial detail, partly broken away, of one of the spring suspension arrangements of an adapter such as that shown in the assembly of FIGURES 1-3.

FIGURE 12 portrays portions of improved mobility adapters connected back-to-back by way of fittings permitting self-locking, and FIGURE 13 is a disassembled view of cooperating elements of a fitting of the type shown in FIGURE 12 for joining a pair of adapters for towing without a load.

The equipment illustrated in FIGURES 1–3 includes demountable front and rear wheeled adapters, 14 and 15, respectively, which support and render mobile a load in the form of a shelter 16 having a generally rectangular outline. Shelters of this type, may serve as convenient field communications centers, hospital units, storage containers, or the like, and are intended to be hauled to desired sites where they can be lowered and rested upon suitable terrain on their bottom rails or skids, 17. Many such payloads are fabricated of metal panelling affixed to rigid high-strength metal framework; in certain other instances internal framework may be omitted in favor of lightweight sandwich-type construction wherein spaced sheet metal panels are integrated into a sturdy assembly by a filling of foamed plastic. Access to the interior is afforded by a door 18 at the forward end, and other irregularities, such as windows and exterior attachments of various forms may also be present. Depending upon the locations of these irregularities, it may in some cases be inconvenient to make needed coupling connections with the running gear; structure lacking internal framing may also be unsuited to such connection because unbraced walls will quickly deteriorate under the severe forces experienced during towing. However, not only are these difficulties overcome by the connecting arrangements used with the adapters 14 and 15, but, in addition, the riding qualities are enhanced as a consequence of torsional resilience developed between the load-supporting positions. As it is shown, the front adapter 14, to which the towing bar 19 is hinged, is connected to shelter 16 at two spaced positions inwardly of the sides, by connectors 14a and 14b fastened to the load along its bottom front edge 16a, and is further connected to the shelter by connectors 14x and 14y each fastened along a different one of the front vertical edges 16x and 16y, respectively. Similarly, the rear adapter 15 is connected to shelter 16 at two spaced positions inwardly of the sides, by connectors 15a and 15b fastened to the load along its bottom rear edge 16b, and is further connected to the shelter by connectors 15x and 15y each fastened along a different one of the rear vertical edges 16x' and 16y', respectively. The right-angle corners or edges 16a, 16b, 16x, 16y, 16x', and 16y' are sites of inherently high strength, even in the case of loads of sandwich-type fabrication, and highly effective connections made thereby riveting, bolting and/or welding along the margins of the respective sides which join there. Much of the loading, including the intense variable loadings occurring during hauling, can thus be opposed by longitudinal tension and shear forces in the sides, which forces are well withstood by panel-type members. As is explained in greater detail hereinafter, the various front and rear sets of connectors (14a, 14b, 14x, and 14y, and 15a, 15b, 15x, and 15y, respectively) are of separable constructions, involving parts permanently fitted to the load edges and mating parts carried upon the respective front and rear wheeled adapters. The latter connector parts are cooperatively associated with a special torsion bar in each adapter unit, these being illustrated as bars 20 and 21 in the cases of adapters 14 and 15, respectively. The illustrated preferred torsion bar structure is that of a lightweight hollow box beam, oriented with a flat side substantially horizontal when the load is fully elevated, such that operating personnel may develop a good foothold if they should step upon it. Alternatively, a hollow or solid torsion bar of different cross-section, such as a circular cross-section, may be utilized instead in applications where weight, shape and size are not critical. At each of its two extremities, each of the torsion bars is attached to a separate bracket, as by welding, to which an end of a hydraulic jack is pivotally fastened in eccentric relationship to the longitudinal axis of the bar, and in direction away from the intended position of the load. The four jacks are designated by reference characters 22–25, and the cooperating brackets are numbered 22a–25a in the drawings. Connecting parts which mate with other elements of the lower edge connectors 14a, 14b, 15a and 15b are also affixed to the respective torsion bars 20 and 21, inwardly of the extremities of the bars. These lower edge connectors allow for at least slight pivotal movements about axes which are parallel with the torsion bars, and, although they may in some instances involve mere pinning between parts, these connectors are advantageously of a structure disclosed later herein and imparting certain self-locking characteristics.

Each of the torsion bars 20 and 21 is coupled with one of the axles 26 and 27, respectively, which are held in spaced parallel relation to them by laterally-spaced pairs of unique semi-elliptical spring units, 28, 29 and 30, 31, respectively. Rubber-tired wheels 32–35 are supported in pairs on the adapter axles and may be equipped with automotive-type brakes actuated hydraulically; in the case of the front adapter 14, which is directly connected with a towing vehicle, the axle structure is equipped with a common automotive knuckle-type steering mechanism 36. Tow bar 19 is hinged at 37 and carries a lunette 38 at its end, for coupling with a towing vehicle.

The aforesaid construction involves a highly simplified, small, and advantageous spring coupling between the axle and load-connected torsion bar in each adapter. Such spring coupling, in the vertical direction, is provided by the semi-elliptical spring units 28–31, and radius rods 39–42 provide further auxiliary couplings in the fore-aft directions which aid principally in handling braking thrusts. An important aspect of the semi-elliptical spring structures is best perceived in the enlargement of one of these, unit 29, appearing in FIGURE 4. The semi-elliptical spring, 43, is fabricated using one or more leaf elements (three being illustrated, with shackles such as shackle 44), and is firmly connected only at its ends, where it engages the pins 45 and 46. One of these pins, 45, is secured in fixed relationship to the torsion bar 20, and this is conveniently accomplished by mounting that pin close to the bar within the sturdy hollow cantilever-type brace 47 which is welded or otherwise fastened inseparably to the bar and somewhat loosely encloses the spring 43 along at least about half its length. The other pin, 46, is held fixed in relationship to front axle 26 in a bracket 48. Brace 47 provides restraints for the simple shallow spring 43 in both the lateral directions of arrows 49 and the vertical directions of arrows 50 in FIGURE 4, whenever certain intentionally-provided freedoms for such relative movements are exceeded. Importantly, the loose fit between the brace and partially-enclosed spring enables the latter to develop significant torsional twisting generally in angular directions 51, as well as vertical flexure, such that one wheel of the adapter assembly can make brief vertical excursions due to road irregularities without at the same time severely jarring the payload. The shock isolations thus produced improve the load suspension characteristics very materially, and yet the spring depth is slight and its construction is uncomplicated, relatively inexpensive, and requires little maintenance. Absence of any fixed connection between the end 47a of brace 47 and the mid portion of spring 43 promotes the desired torsional flexibilities, which would otherwise be very limited. Any such fixed connection would also effectively disable half of the spring, whereas the illustrated construction renders it active in isolation of the load throughout its length. It should be appreciated that although the downwardly-curved semi-elliptical spring normally abuts against and is braced by the inner upper end 47a of the brace, some relative sliding actions occur as the spring flexes vertically and is flattened (and slightly elongated in span) to different extents. Torsion bar 20 also tends to twist and flex and thereby provide further resilience and isolation. Depending upon the intended loading, the springs used may involve but one leaf, or many leaves. The bracing is particularly advantageous in the hollow enclosed form illustrated, but it may in some instances be of an open form, or may be as simple as a stiff bar or plate positioned above the spring. Similar bracing effects can be produced by affixing a brace to the spring at about its mid position and providing for a loose and sliding fit between the brace and torsion bar at the site where they fit together. Alternatively, the positions of the torsion bar and axle may be reversed, with the brace being affixed to the latter.

Figure 5:
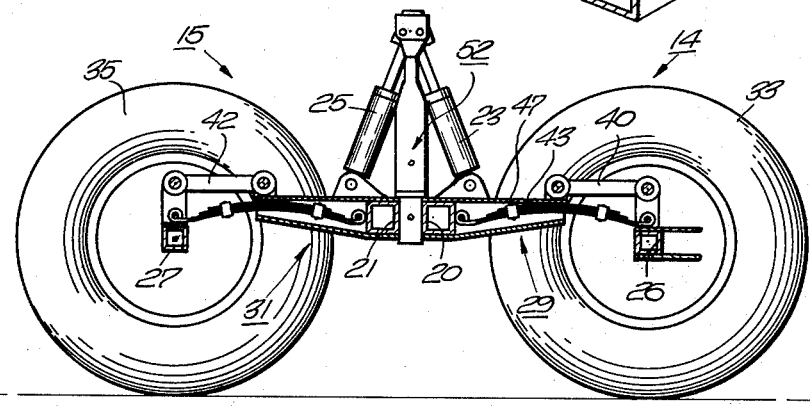
FIGURE 5 depicts a pair of front and rear mobility adapters coupled together for towed movements without a payload, the adapters being cross-sectioned along spring suspension locations.

A pair of adapters which serves a number of payloads must at times be transported in an essentially loadless condition, when they have served their main function with one and are to be brought to the location of another for a further towing operation. Adapters made in accordance with these teachings advantageously lend themselves to interconnection by way of the same end connectors through which they are connected to a payload, and, as is depicted in FIGURE 5, the adapters 14 and 15 are readily connected in back-to-back relationship for such purposes. Preferably, the torsion bars 20 and 21 of the two adapters are power-elevated to the level position shown, by the hydraulic jacks 23 and 25 pressurized by easy manipulation of a small hydraulic pump such as is referred to later herein. This powering, and a resulting automatic secure interlocking of the two adapters, is aided by the use of a special coupling unit 52 of the type disclosed in FIGURES 12 and 13 and described in the related text which follows. Where the construction is of a particularly lightweight type designed to support only relatively light payloads, other interconnection provisions of known form may be used to fasten the two torsion bars together.

Figure 6:
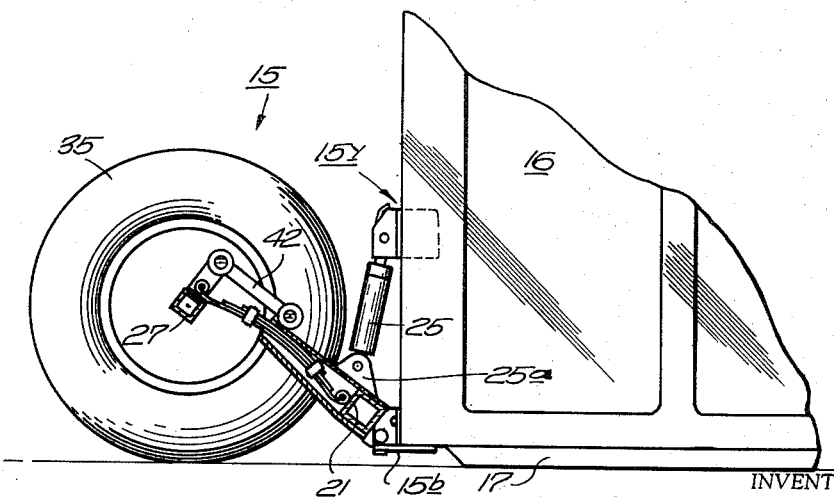
FIGURE 6 illustrates a similarly cross-sectioned rear adapter in a downwardly-tilted position and in connection with a portion of a shelter resting at a lowered position.

Coupling of a mobility adapter to a payload is accomplished while the latter is at rest upon some surface, as represented in FIGURE 6. There, the shelter 16 is at rest on its skids 17, and a connecting element of torsion bar 21 of rear adapter 15 has been fitted to the shelter lower edge connector 15b; in addition, a connector element of the hydraulic jack 25 has also been fitted to the shelter's vertical edge connector 15y. Upon pressurizing of the jack 25 and its mate 24, the end of the shelter is automatically raised to a height at which the torsion bar 21 is level; the eccentric connection of the lower ends of the jacks to their torsion bar mounting brackets 25a and 24a insures that the jacking forces will be effective to straighten out (i.e. level) the torsion bar and thereby elevate the shelter. Self-locking of the shelter and adapter is accomplished simultaneously, as is described hereinafter.

In FIGURE 7, the rear mobility adapter 15 is depicted in a connected fully-elevated relationship with another and irregular form of shelter, 16′, which has a modified configuration involving large recesses 53 and 54 along the lower edges of both sides. Nevertheless, the inwardly and upwardly spaced edge connectors 15a′, 15b′, 15x′ and 15y′ (which correspond to the aforementioned connectors 15a, 15b, 15x and 15y) readily make the needed couplings with the adapter. The door 55 at the rear end of this shelter likewise does not interfere with the desired connections. A manually-operated hydraulic pump 56 unit is shown mounted upon the adapter framework, for pressurizing the two hydraulic jacks 24 and 25 via piping 57 and 58 when the handle 59 is pumped.

The shelter fragment appearing in FIGURE 8 typifies a lightweight construction in which certain strengths are obtained without depending upon the presence of internal framework. Instead, spaced sheet metal inner and outer panels 60 and 61 are bonded together in an integrated high-strength wall by a known arrangement of foamed plastic material 62 sandwiched between them. External sheet metal angle reinforcements, such as that designated by reference character 63, augments the edge and corner strengths and also aid in providing good anchorage of the edge connectors serving the mobility adapters. Coupling connections along the lower front edge 16a are advantageously made to the two sides of reinforcement 63, although in other instances the connections may instead be made to the outer panelling 61 along broad areas. The elements of one of the lower edge connector, 14b, which are viewed in FIGURES 8, 9A and 9B are of construction promoting important self-locking characteristics and yet also permitting certain slight angular movements which are desirable for purposes of exploiting the torsional resiliency of the associated torsion bar. The coupling element affixed about the lower edge 16a of the payload includes a lower plate member 14c and, at right angles thereto, a pair of spaced bracket members 14d and 14e (FIGURE 2) into which is set and secured a short cylindrically surfaced catch rod 14f. The latter rod is preferably welded to both the bracket and plate members, as shown, with its central longitudinal axis 64 disposed substantially parallel with the lower front payload edge 16a. In addition, a rectangular bar 14g is secured directly below the rod, under the plate member 14c, such that the top cylindrical surface of the rod and the lower flat surface of the bar may act together to form as a special type of catch. Torsion bar 20 carries a cooperating sturdy hook-shaped connector member 14h at a position inwardly spaced from its ends where it may mate with the connector elements affixed to the shelter. Hook member 14h has an inverted G shape which offers an outwardly-extending lip 14i and a shorter outwardly-extending jaw 14j below it, the intervening space having an upwardly-recessed concave cylindrical surface 14k which complements the shape of the upper surface of rod 14f. The separation between cylindrical surface 14k and the upper surface 14l of lower jaw 14j is just slightly in excess of the corresponding separation between the top of rod 14f and the bottom of bar 14g, such that these may be fitted together rather closely. Connection between the shelter and adapter is achieved by dropping the lip 14i of catch member 14h over the rod 14f while the load is resting upon the ground and the adapter is downwardly inclined in the manner shown in FIGURE 6. The orientation between connector elements at that stage is illustrated in FIGURE 9A. Subsequently, as the associated hydraulic jacks are pressurized, the load is elevated and bar 20 is turned to a horizontal position, shown in FIGURE 9B, wherein the connector elements are securely trapped together and because of mechanical interferences, separation is impossible unless the load is first lowered to the ground. The sense of pivotal movement of torsion bar 20 about axis 64 during this locking operation is indicated by arrow 65 in FIGURE 9A. Some freedom for slightly angular motion in the opposite direction about axis 64 remains during transportation of the load, restricted by torsional restraint of torsion bar 20, and this resiliency in the support of the load provides desirable isolation against road shock and the like. The other connectors, 14a, 15a, and 15b, are of similar construction, of course.

Connections made along vertical edges of the shelter are also caused to be self-locking and to remain fast except when the payload is lowered. For these purposes, the vertical edge connector 14x in FIGURE 10 includes mechanically-interfering parts on an angle-bracket structure affixed to the edge 16x of shelter 16 and on the upper end of push rod 24a of hydraulic jack 24. Plates 66 and 67 together form a U-shaped connector element which is angled about and welded to the edge reinforcement 68, and which also carries a transverse catch rod 69 and an upwardly- and inwardly-spaced bar 70 exhibiting a substantially horizontal ledge surface 71. The horizontal rod 69 is spaced from the back of the U-shaped connector to permit its mating between the jaws 72 and 73 of the hook-shaped jack fitting 74 as the jack rod 24a is pushed upwardly in the direction of arrow 75. One of the jaws, 73, of the jack fitting 74 is caused to be highly elongated, by the addition of an extender 73a, and its outer end 73b is shaped as an inwardly-extending lip which will abut the top ledge surface 71 of bar 70 when the jack tilts fitting 74 toward the shelter about the axis 76—76 of rod 69. Double-dashed linework 77 in FIGURE 10 characterizes the fully tilted condition, wherein the connector portions are locked securely against unintended separation so long as the jack 24 is substantially fully extended. When the jack is no longer pressurized, and can be depressed by the load, the adapter tilts downwardly with the descending load and its end fitting 74 assumes the full-line position illustration in FIGURE 10. The fitting can then be pulled downwardly, or will itself drop downwardly, away from and free of the coupling rod 69. Connection is made by positioning the fittings in alignment with the rods, after which the pressurized jacks will complete the tilting and locking automatically. The use of bolts, pins, and the like may thus be advantageously avoided.

Mobility adapters constructed in accordance with these teachings also lend themselves to use with pallet-type load units, such as unit 78 appearing in FIGURE 11. Portions of an adapter, 79, are illustrated, and it should be understood that this may involve structure like that of the adapter 14 already described hereinabove; accordingly, the same reference characters are applied to the adapter elements, with distinguishing single-prime accents being added. Connector 14a' serves to couple the front edge of the pallet with the torsion bar 20' at a position inwardly spaced from the end of that bar, and end bracket 22a' couples one end of the hydraulic jack 22' with the torsion bar eccentrically of its longitudinal axis 80—80. Specifically, the locus 81 of the jack connection is established sufficiently above and rearwardly of axis 80—80 so that the jack forces exerted there will pivot the adapter about the wheel axle (not shown in FIGURE 11) even when the adapter and load are in their lowered positions. Pallet 78 is also coupled to the other end of jack 22', by way of a bracket 82 affixed to it at its side, preferably at a distance from its corner 83 which accommodates the somewhat lengthy jack. Pressurizing of the jack results in elevation of the pallet to the illustrated elevated position, from a lowered position.

In FIGURES 11 and 12, the mechanism 52 for connecting a pair of mobility adapters together in back-to-back relationship is portrayed in detail. This mechanism is preferably fabricated inexpensively of plate-type flat stock, a construction which is feasible because the two main cooperating parts, 84 and 85, are exposed largely to forces of tension. Elongated bar member 85 interconnects the two end brackets 23a' and 25a', and, for this purpose, is provided with keyed slots 85a and 85b which readily fit over the heads of and lock with the cooperating keying pins 85c and 85d, respectively, on these brackets. Bar 85 is fastened to the lower yoke-shaped end 84a of vertical bar member 84 by a pin 86 which passes through yoke holes 84b and the corresponding hole 85e in bar member 85. At its upper end, 84c, the vertical bar member 84 is formed to receive and lock with the special jack fittings 87 and 88, both of which are generally like the fitting 73, shown in FIGURE 10, in that they involve jaw structures and an extended member having a lip which is adapted to rest against a ledge surface for self-locking purposes. The latter ledge surface, 84d, is provided by the bar 84e atop the yoke-shaped end 84c of member 84, and the transverse rods 84f and 84g serve the same function as rod 69 in the assembly of FIGURE 10. Braces 89 and 90, which have U-shaped ends as shown in FIGURE 12, are pivotally attached to the brackets 23a' and 25a', respectively, at the same positions, 91 and 92, at which the lower ends of the jacks are pivoted. Once the jacks are pressurized and extended, these braces are pivoted to nest about the extended lower ends of the jacks, such as end 90a of jack 25, and, thereby, to prevent their accidental collapse in the event hydraulic pressure is lost. When the jacks are connected to the upper end 84c of vertical bar member 84, hydraulic pressure will cause the jacks to extend and elevate the torsion bars 20 and 21 of the adapters to a level with the adapter axles, whereupon the adapters are rendered securely locked together for towing in the raised condition.

The specific embodiments of the invention herein disclosed are, of course, of a descriptive rather than a limiting nature, and those skilled in the art will recognize that various changes, combinations, substitutions and modifications may be exploited in accordance with these teachings without departing either in spirit or scope from this invention in its broader aspects.

What I claim as new and desire to secure by Letters Patent of the United States is:

1. A wheeled adapter for imparting shock-isolated mobility to an end of a load, comprising elongated axle means supporting rotatable wheels at opposite ends thereof, elongated support means substantially parallel with said axle means in spaced relationship thereto, at least two semi-elliptical spring units each connected to said axle means and to said support means at laterally-spaced positions and preserving said support means in said spaced relationship to said axle means, each of said units including a convex semi-elliptical spring having its opposite ends connected to said axle means and support means, respectively, and further including mechanical stop means preventing upward movement of the mid position of said spring relative to one of said support and axle means beyond a predetermined amount, and connector means on said support means for detachably connecting said support means to a load at a plurality of laterally-spaced positions.

2. A wheeled adapter for imparting shock-isolated mobility to an end of a load, comprising elongated axle means supporting rotatable wheels at opposite ends thereof, elongated support means substantially parallel with said axle means in spaced relationship thereto, at least two semi-elliptical spring units each connected to said axle means and to said support means at laterally-spaced positions therealong and preserving said support means in said spaced relationship to said axle means, each of said units including a convex semi-elliptical spring having at least one leaf and having its opposite ends connected to said axle means and support means, respectively, and further including mechanical stop means fixed in relation to said support means and extending freely over said spring to a position of abutting slidable engagement with the mid position thereof and thereby preventing upward movement of the mid position of said spring relative to said support means beyond a predetermined amount, and connector means on said support for connecting said support means to a load at a plurality of laterally-spaced positions.

3. A wheeled adapter for imparting shock-isolated mobility to and end of a load, comprising elongated axle means supporting rotatable wheels at opposite ends thereof, elongated torsionally-resilient means substantially parallel with said axle means in spaced relationship thereto, a pair of semi-elliptical spring units each connected to said axle means and to said torsionally-resilient means at laterally spaced positions therealong and preserving said torsionally-resilient means in said spaced relationship to said axle means, each of said units including a convex semi-elliptical spring having at least one leaf and having its opposite ends connected to said axle means and torsionally-resilient means, respectively, and further including mechanical stop means preventing upward movement of the mid position of said spring relative to one of said axle and torsionally-resilient means beyond a predetermined amount, and connector means on said support at a plurality of laterally-spaced positions spaced from the positions at which said spring units are connected to said torsionally-resilient means for detachably connecting said torsionally-resilient means to a load.

4. A wheeled adapter for imparting shock-isolated mobility to an end of a load, comprising elongated axle means supporting rotatable wheels at opposite ends thereof, an elongated torsion bar substantially parallel with said axle means in spaced relationship thereto, a pair of semi-elliptical spring units each connected to said axle means and to said torsion bar at laterally-spaced positions therealong near said wheels and preserving said torsion bar in said spaced relationship to said axle means, each of said units including a convex semi-elliptical spring having at least one leaf and having its opposite ends connected to said axle means and torsion bar, respectively, and further including mechanical stop means fixed in relation to said torsion bar and extending freely over said spring to a position abutting slidable engagement with the mid position therealong and thereby preventing upward movement of the mid position of said spring relative to said torsion bar beyond a predetermined amount while at the same time permitting torsional flexures of said spring, and connector means on said torsion bar at a plurality of laterally-spaced positions spaced from the positions at which said spring units are connected to said torsion bar for connecting said torsion bar to the load.

5. A wheeled adapter for imparting shock-isolated mobility to an end of a load, comprising elongated axle means supporting a pair of rotatable wheels at the ends thereof, an elongated torsion bar substantially parallel with said axle means in spaced relationship thereto, a pair of semi-elliptical spring units each connected to said axle means and to said torsion bar at laterally-spaced positions therealong near said wheels and preserving said torsion bar in said spaced relationship to said axle means, each of said units including a convex semi-elliptical spring having at least one leaf and having its opposite ends connected to said axle means and torsion bar, respectively, and further including mechanical stop means affixed to said torsion bar and extending freely over said spring to at least about the mid position therealong and thereby preventing upward movement of the mid position of said spring relative to said torsion bar beyond a predetermined amount while at the same time permitting torsional flexures of said spring, and connector means on at least the end portions of said torsion bar and in laterally-spaced relationship to the connections of said spring units to said torsion bar for connecting said torsion bar to the load.

6. A wheeled adapter for imparting shock-isolated mobility to an end of a load as set forth in claim 5 wherein said connector means includes at least two connectors mounted one at each end of said torsion bar for connecting said torsion bar with the load, and at least another connector mounted on said torsion bar at a position intermediate said two connectors, said other connector permitting relative pivotal movements of said load and torsion bar about an axis substantially parallel with said torsion bar.

7. A wheeled adapter for imparting shock-isolated mobility to an end of a load as set forth in claim 6 wherein said torsion bar comprises a hollow beam member of a substantially rectangular cross-sectional outline, said torsion bar being positioned to exhibit a substantially flat and horizontal upper surface when oriented at substantially the same level above the ground as said axle means.

8. A wheeled adapter for imparting shock-isolated mobility to an end of a load, comprising elongated axle means supporting rotatable wheels at the ends thereof, elongated support means substantially parallel with said axle means in spaced relationship thereto, at least two semi-elliptical spring units each connected to said axle means and to said support means at laterally-spaced positions and preserving said support means in said spaced relationship to said axle means, each said units including a convex semi-elliptical spring having its opposite ends connected to said axle means and support means, respectively, and further including mechanical stop means preventing both upward and downward movement of intermediate portions of said spring relative to one of said support and axle means beyond a predetermined amount while affording freedom for sliding and torsional movements of said spring relative to said stop means, and connector means on said support means for connecting said support means to a load at a plurality of laterally-spaced positions.

9. A wheeled adapter for imparting shock-isolated mobility to an end of a load as set forth in claim 8 wherein said connector means includes a pair of expandable and contractible jacks, means pivotally connecting one end of each of said jacks to said elongated support means at a different outer end thereof in an eccentric relationship to the longitudinal axis of said elongated support means which effects a cranking action on said support means about said longitudinal axis in direction tending to urge said axle means downwardly when said jacks exert thrusts at the sites of said pivotal connecting means, connecting means for connecting said support means to the load with freedom for relative movement therebetween about an axis substantially parallel with said longitudinal axis, and connection means at the other ends of said jacks for engaging and exerting thrusts upon the load.

10. A wheeled adapter for imparting shock-isolated mobility to an end of a load, comprising elongated axle means supporting rotatable wheels at opposite ends thereof, elongated support means, means preserving said support means substantially parallel with said axle means in spaced relationship thereto, a pair of expandable and contractible jacks, means pivotally connecting one end of each of said jacks to said elongated support means at a different outer end thereof in an eccentric relationship to the longitudinal axis of said elongated support means which effects a cranking action on said support means about said longitudinal axis in direction tending to urge said axle means downwardly when said jacks exert thrusts at the sites of said pivotal connecting means, connecting means for connecting said support means to the load with freedom for relative movement therebetween about an axis substantially parallel with said longitudinal axis, and connection means at the other ends of said jacks for engaging and exerting thrusts upon the load.

11. A wheeled adapter for imparting shock-isolated mobility to an end of a load, comprising elongated axle means supporting rotatable wheels at opposite ends thereof, an elongated torsion bar, means preserving said torsion bar substantially parallel with said axle means in spaced relationship thereto, a pair of expandable and contractible jacks, means pivotally connecting one end of each of said jacks to said elongated torsion bar at a different outer end thereof in an eccentric relationship to the longitudinal axis of said torsion bar which effects a cranking action on said torsion bar about said longitudinal axis in direction tending to urge said axle means downwardly when said jacks exert thrusts at the sites of said pivotal connecting means, at least one separable connector for connecting said torsion bar to the load with freedom for relative movement therebetween about a connector axis substantially parallel with said longitudinal axis, and separable connection means including connector fittings at the other ends of said jacks for engaging and exerting thrusts upon the load.

12. A wheeled adapter for imparting shock-isolated mobility to an end of a load as set forth in claim 11 wherein said separable connector for connecting said torsion bar to the load comprises an inverted hook-shaped connector member and a cooperating catch member having a substantially cylindrical upper surface proportioned to receive and permit pivotal movement of said hook-shaped member thereon about said connector axis.

13. A wheeled adapter for imparting shock-isolated mobility to an end of a load as set forth in claim 12 wherein said inverted hook-shaped connector member is rigidly affixed to said torsion bar and wherein said cooperating catch member includes mutually perpendicular flanges for connection to a vertical end and horizontal under side of a load along an edge at the end of the load.

14. A wheeled adapter for imparting shock-isolated mobility to an end of a load as set forth in claim 13 wherein said inverted hook-shaped connector member is partly closed by a lower jaw, and wherein said catch member is proportioned to substantially fill and remain locked within said hook-shaped member when these members are hooked together and are pivoted about said connector axis into fully mated engagement.

15. A wheeled adapter for imparting shock-isolated mobility to an end of a load as set forth in claim 11 wherein each of said separable connection means for said jacks comprises a hook-shaped connector fitting at said other end of one of said jacks, one of the jaws of said hook-shaped fitting being longer than the other and having an inwardly-inclined lip at its outer end, and a cooperating catch unit having a substantially rod-shaped catch and a spaced ledge surface proportioned to engage and lock with said hook-shaped fitting and said lip, respectively, when said hook-shaped fitting is hooked on said rod-shaped catch and pivoted about the axis of said rod-shaped catch, said catch unit further including mutually perpendicular flanges for connection to a vertical end and vertical side of a load along a vertical edge at the end of the load.

16. In a wheeled adapter arrangement for imparting shock-isolated mobility to ends of a load, a pair of like wheeled adapters each comprising elongated axle means supporting rotatable wheels at opposite ends thereof, an elongated support member, means preserving said support member substantially parallel with said axle means in spaced relationship thereto, a pair of expandable and contractible jacks and means pivotally connecting one end of each of said jacks to said elongated support member at a different outer end thereof in an eccentric relationship to the longitudinal axis of said support member which effects a cranking action on said support member about said longitudinal axis in direction tending to urge said axle means downwardly when said jacks exert thrusts at the sites of said pivotal connecting means, said jacks each having a hook-shaped connector fitting at the other ends thereof, one of the jaws of said hook-shaped fitting being longer than the other and having an inwardly-inclined lip at its outer end, and means for connecting said adapters in back-to-back relationship for towing together, comprising a pair of interconnecting units each including an elongated interconnecting member having at one end rod-shaped catches positioned to be hooked by the hook-shaped fitting of two jacks from two back-to-back adapters and a spaced ledge surface oriented to be engaged by and locked with the lips of the hook-shaped fittings of the same two jacks when said jack fittings are hooked on said catches and pivoted about said rod-shaped catches, a connector bar having keyed slots near the ends thereof, pins one at each end of said elongated support means proportioned for engagement and locking with said bar through the keyed slots therein when said bar is passed over the pins and the adapters are forced in direction away from one another, and means separably connecting said connector bar with the other end of said elongated interconnecting member at a position intermediate said keyed slots.

17. In a wheeled adapter arrangement as set forth in claim 16, said interconnecting member and bar member being formed of flat metal plate stock.

18. A wheeled adapter for imparting shock-isolated mobility to an end of a load, comprising elongated axle means supporting rotatable wheels at opposite ends thereof, elongated torsionally-resilient means substantially parallel with said axle means in spaced relationship thereto, a pair of semi-elliptical spring units each connected to said axle means and to said torsionally-resilient means at laterally-spaced positions therealong near said wheels and preserving said torsionally-resilient means in said spaced relationship to said axle means, each of said units including a convex semi-elliptical spring having at least one leaf and having its opposite ends connected to said axle means and torsionally-resilient means, respectively, and further including mechanical stop means preventing upward movement of the mid portion of said spring relative to one of said axle and torsionally-resilient means beyond a predetermined amount, a first pair of separable connector means each having a connector fixed to a different end of said torsionally-resilient means and a cooperating connector including mutually perpendicular flanges for connection with a vertical side and end of the load along a vertical edge of the load, and a second pair of laterally-spaced separable connectors each having a connector fixed to said torsionally-resilient means inwardly of the ends thereof and a cooperating connector including mutually perpendicular flanges for connection with the vertical end and horizontal under side of the load along a horizontal lower edge of the load.

19. A mobility adapter for imparting shock-isolated mobility to an end of a load, comprising elongated axle means supporting rotatable wheels at the ends thereof, an elongated torsion bar substantially parallel with said axle means in spaced relationship thereto, a pair of semi-elliptical spring units each connected to said axle means and to said torsion bar at laterally-spaced positions therealong near said wheels and preserving said torsion bar in said spaced relationship to said axle means, each of said units including a convex semi-elliptical spring having at least one leaf and having its opposite ends connected to said axle means and torsion bar, respectively, and further including mechanical stop means in the form of a hollow tubular beam affixed at one end to said torsion bar in a free surrounding relationship to said spring along at least about half the length thereof and thereby preventing vertical and horizontal movements of said spring relative to said torsion bar beyond predetermined amounts while at the same time permitting relative sliding and torsional movements of said spring, connector means at the ends of said torsion bars for connecting said torsion bar to the load along vertical edges of an end thereof, and connector means intermediate the ends of said torsion bar for connecting said torsion bar to the load along the lower horizontal edge of an end thereof.

References Cited by the Examiner

UNITED STATES PATENTS

| | | | |
|---|---|---|---|
| 1,396,549 | 11/21 | Beatty | 267—25 |
| 2,200,177 | 5/40 | Klavik | 267—41 X |
| 2,968,490 | 1/61 | Baus | 280—35 |

FOREIGN PATENTS

| | | |
|---|---|---|
| 842,923 | 7/60 | Great Britain. |
| 958,720 | 2/57 | Germany. |

ARTHUR L. LA POINT, *Primary Examiner.*